United States Patent Office 3,766,111
Patented Oct. 16, 1973

3,766,111
POLYESTER MOULDING AND COATING MATERIALS WHICH CAN BE SET BY ULTRAVIOLET IRRADIATION
Wolfgang Metzner, Krefeld, Hans Rudolph, Krefeld-Bockum, Karl Fuhr, Krefeld, and Hermann Schnell, Krefeld-Uerdingen, Germany, assignors to Bayer Aktiengesellschaft
No Drawing. Continuation of application Ser. No. 147,647, May 27, 1971, which is a continuation of application Ser. No. 889,286, Dec. 30, 1969, both now abandoned. This application July 27, 1972, Ser. No. 275,889
Claims priority, application Germany, Jan. 22, 1969, P 19 02 930.2
Int. Cl. C08g $51/52$; C08f $19/00$; C01j $1/12$
U.S. Cl. 260—28
9 Claims

ABSTRACT OF THE DISCLOSURE

The invention relates to moulding and coating compositions which can be set by U.V. irradiation comprising mixtures of unsaturated polyesters and copolymerisable monomeric compounds, sensitized by an effective amount of benzoin ethers of primary alcohols and stabilized by an effective amount of copper compounds. The compositions are distinguished by a high storage stability in the dark and a high reactivity under U.V. radiation, while the curing velocity is additionally increased by infrared rays.

CROSS REFERENCE TO RELATED APPLICATIONS

This application is a continuation of application Ser. No. 147,647 filed May 27, 1971 and now abandoned, said latter application in turn being a continuation of application Ser. No. 889,286 filed Dec. 30, 1969 and now abandoned.

The present invention relates to mouding and coating compositions which can be set by U.V. irradiation comprising mixtures of unsaturated polyesters and copolymerisable monomeric compounds with a content of benzoin ethers as photosensitizers.

It is known from the disclosed data of Belgian patent specification No. 714,605 that benzoin ethers are effective photosensitizers for the U.V. setting of moulding and coating compositions comprising mixtures of unsaturated polyesters and copolymerisable monomeric compounds, but that compositions of this type containing benzoin ethers of primary alcohols have only a very poor stability in dark storage which precludes their practical use, whereas compositions containing benzoin ethers of secondary alcohols have virtually the same high reactivity in U.V. light and a dark storage stability which is quite sufficient for practical use.

It is further known from these data that the compositions containing benzoin ethers of secondary alcohols should expediently contain an inhibitor, possibly copper compounds, in the usual amounts, although this somewhat reduces the reactivity of the compositions in U.V. light.

Surprisingly, it has now been found that by the addition of the usual amounts of copper compounds to polyester moulding and coating compositions comprising unsaturated polyesters and copolymerisable monomeric compounds containing benzoin ethers of primary alcohols, the dark storage stability of these compositions is very strongly increased while the reactivity in U.V. light is the same or even slightly higher.

Furthermore, these photopolymerisable compositions compare favourably with corresponding compositions containing benzoin ethers of secondary alcohols in that, during curing, they respond more readily to infrared radiation, besides to the required ultraviolet radiation. This infrared radiation can be generated by mercury high pressure burners which have hitherto frequently been used for the photopolymerisation of unsaturated polyester resins, but with particular advantage by special infrared radiators in combination with fluorescent lamps of superactinic radiation.

The subject-matter of the invention therefore comprises moulding and coating compositions which can be set by U.V. irradiation comprising mixtures of unsaturated polyesters and copolymerisable monomeric compounds, sensitized by an effective amount of benzoin ethers of primary alcohols and stabilized by an effective amount of copper compounds.

The aforesaid technical advance constituted by these compositions can be seen from the following comparative tests:

An unsaturated polyester prepared by polycondensation of 152 parts by weight maleic acid anhydride, 141 parts by weight phthalic acid anhydride, and 195 parts by weight propane-diol-1,2 in the presence of 0.012 parts by weight hydroquinone, was dissolved in styrene to give a 65 percent by weight solution (resin supply form).

Portions of 98.5 percent by weight of this resin supply form were mixed with 1.5 parts by weight benzoin isopropyl ether, on the one hand, and with benzoin methyl ether or ethyl ether, on the other hand, and, in addition, with two different copper compounds in varying amounts [ the copper compound I is the addition product of trichloroethyl phosphite on to copper (I) chloride (copper content 9.4 percent by weight); the copper compound II is copper naphthenate (copper content 10 percent by weight)].

The stability in dark storage of these mixtures (start of gelling) was determined at 20° C.

Furthermore, the reactivity in U.V. light was determined as follows:

Portions of 100 parts by weight of the mitxures were admixed with a further 15 parts by weight styrene and 1.5 parts by weight of a 10% solution of paraffin (melting point 52–53° C.) in toluene, and the mixtures so obtained were applied with a film forming apparatus to a glass plate of 9 mm. thickness to produce films with a layer thickness of 500$\mu$.

The coated glass plates were then irradiated for 1½ minutes with a fluorescent lamp Osram L 40 w./70–1 at a distance of 5 cm.; the paraffin had then floated out and the film was gelled. The coated glass plates were then exposed for 3 minutes to the combined radiation of 2 fluorescent lamps Osram L 40 w./70–1 and an infrared radiator which was symmetrically arranged between the two fluorescent lamps. An aluminum reflector protected the fluorescent lamps from direct infrared radiation. The distance of the 2 fluorescent lamps from one another amounted to 16 cm., the distance of the radiator arrangement from the glass plates to 10 cm. During the time of irradiation, the temperature of the glass plates rose to about 70° C.

When this treatment was completed and the coated glass plates had cooled down, the paraffin layer was removed by grinding and polishing, and the pendulum hardness of the films was determined after a storage time of 60 minutes according to König as a measure for the reactivity of the compounds.

The results of these tests are assembled in the following table.

| | Cu compound, percent by weight | Dark storage stability in months at 20° C. | Pendulum hardness according to König |
|---|---|---|---|
| Isopropyl ether | Nil | >6 | 80 |
| | I ......... 0.0006 | >6 | 70 |
| | II ......... 0.0006 | >6 | 62 |
| | I ......... 0.0030 | >6 | 76 |
| | II ......... 0.0030 | >6 | 50 |
| Methyl ether | Nil | 0.5 | 86 |
| | I ......... 0.0006 | 3-5 | 92 |
| | II ......... 0.0006 | 3-5 | 100 |
| | I ......... 0.0030 | 3-5 | 86 |
| | II ......... 0.0030 | 3-5 | 109 |
| Ethyl ether | Nil | 0.75 | 94 |
| | I ......... 0.0006 | >6 | 102 |
| | II ......... 0.0006 | >6 | 94 |
| | I ......... 0.0030 | >6 | 95 |
| | II ......... 0.0030 | >6 | 94 |

Unsaturated polyesters in the meaning of the invention are all unsaturated polyesters with a content of radicals of $\alpha,\beta$-unsaturated dicarboxylic acids and possibly of other carboxylic acids as well as of mainly polyhydric alcohols.

Examples of carboxylic acids suitable for the synthesis of the polyester resins are: maleic acid, fumaric acid, itaconic acid, mesaconic acid, citraconic acid, succinic acid, glutaric acid, adipic acid, phthalic acid, tetrachlorophthalic acid, hexachloro-endomethylene-tetrahydrophthalic acid, trimellitic acid, benzoic acid, linseed oil fatty acid, and dehydrated castor oil fatty acid.

Suitable alcohols are, for example, ethylene glycol, diethylene glycol, propane-, butane- and hexane-diol, trimethylolpropane, pentaerythritol, butanol, and tetrahydrofurfuryl alcohol.

It is also possible to use the so-called air-drying polyester coating masses which contain, besides the radicals of $\alpha,\beta$-unsaturated dicarboxylic acids, $\beta,\gamma$-unsaturated ether radicals, either as constituents of the polyesters, e.g. according to German published specification No. 1,024,654, or as constituents of other mixture components, e.g. according to German patent specification No. 1,067,210 and German published specification No. 1,081,222.

The copolymerisable monomeric compounds comprise the unsaturated copolymerisable compounds containing vinyl groups which may be substituted in the $\alpha$-position or containing allyl groups substituted in the $\beta$-position, as are conventionally used in the polyester resin technique, for example, styrene, vinyl-toluene, divinyl-benzene, vinyl acetate, acrylic acid and its esters, acrylonitrile, methacrylic acid and its corresponding derivatives, as well as allyl esters, such as allyl acetate, allyl acrylate, phthalic acid diallyl ester, triallyl phosphate, and triallyl cyanurate.

Suitable benzoin ethers of primary alcohols are, for example, the benzoin methyl, ethyl and n-propyl ethers, furthermore, the ethyl ethers of 4,4'-dichloro-, 4,4'-dimethyl-, 4,4'-dimethoxy-benzoin. The benzoin methyl and ethyl ethers are easily obtainable and therefore preferred. Of these two compounds, the benzoin ethyl ether proved to be more advantageous for the coating compositions according to the invention, on account of its properties. The benzoin ethers can be used by themselves or mixed with one another, expediently in amounts of from about 0.1 to about 5 percent by weight.

Suitable copper compounds are those mentioned in U.S. patent specifications Nos. 3,028,360 and No. 3,360,589, e.g. copper naphthenate and, in particular, the copper complex compound used in the above experiments, which is characterised by being colourless and by its higher effectiveness at an elevated temperature. They are expediently used in amounts of up to about 50 p.p.m., preferably about 0.1 to about 10 p.p.m. of copper, referred to the polyester coating compositions. The polyester coating compositions further may contain, as is usual, small amounts of quinones or appropriate dihydroxy compounds, e.g. p-benzoquinone, 2,5-di-tert.-butyl-benzoquinone, hydroquinone, tert.-butyl-pyrocatechol, 3-methyl-pyrocatechol and 4-ethyl-pyrocatechol, for stabilisation.

The polyester coating compositions according to the invention may also contain polymerisation initiators of another kind, for example, peroxides, such as tert.-butyl perbenzoate, dicumyl peroxide, benzoyl peroxide, lauroyl peroxide, and primarily methyl ethyl ketone peroxide and cyclohexanone peroxide. However, care must be taken that the combined use of metal compounds and peroxides does not impair the storage stability of the polyester coating compositions. It is therefore recommended to add the peroxides only shortly before processing or after the active priming process.

Furthermore, there may be added small amounts of soluble metal salts of another type, e.g. cobalt, zirconium and vanadium compounds; substances which are effective against a discoloration of the films, e.g. acidic esters of phosphoric acid; additives providing protection from heat, burning and yellowing, such as small amounts of U.V. absorbers; strengthening auxiliaries, e.g. glass and textile fibers; fillers and thixotropy agents, e.g. silicic acid and talc.

The compositions according to the invention can be worked up especially fast into films when paraffin or wax or wax-like substances have been added in order to exclude the inhibiting effect of atmospheric oxygen. In this case, however, the strongly accelerating heat supply, e.g. by infrared irradiation, must be dispensed with until a wax film has formed. Then only can the final hardness be achieved within a short time by the combined application of U.V. radiation and heat.

We claim:

1. A moulding and coating composition which can be set by U.V. irradiation comprising a mixture of an unsaturated polyester and a copolymerizable vinyl monomer catalyzed by a catalyst consisting of an effective amount of a benzoin ether of a lower primary alcohol and stabilized by an effective amount of copper compound dark storage stabilizer.

2. The composition of claim 1 wherein the benzoin ether is present in an amount of from about 0.1 to about 5% by weight.

3. The composition of claim 1 wherein the benzoin ether is a methyl or ethyl ether.

4. The composition of claim 1 wherein the copper compound is present in an amount of from about 0.1 to about 10 p.p.m.

5. The composition of claim 1 wherein the copper compound is copper naphthenate.

6. The composition of claim 1 wherein the copper compound is the addition product of trichloroethyl phosphite and copper-(I)-chloride.

7. The composition of claim 1 including a peroxide catalyst.

8. The composition of claim 1 containing a cobalt, zirconium or vanadium compound.

9. The composition of claim 1 containing a wax or wax-like substance.

References Cited

UNITED STATES PATENTS

| | | | |
|---|---|---|---|
| 3,028,360 | 4/1962 | Brooks | 260—863 |
| 3,313,864 | 4/1967 | Rudolph et al. | 260—863 |
| 3,360,589 | 12/1967 | Raichle et al. | 260—863 |
| 3,450,612 | 6/1969 | Rudolph et al. | 204—159.15 |

FOREIGN PATENTS

| | | |
|---|---|---|
| 1,450,589 | 7/1966 | France. |

MORRIS LIEBMAN, Primary Examiner

S. L. FOX, Assistant Examiner

U.S. Cl. X.R.

204—159.15; 260—863